United States Patent Office 3,839,503
Patented Oct. 1, 1974

3,839,503
PROCESS FOR PREPARING BLENDS OF FINELY PARTICULATE POLYACRYLONITRILE AND HIGH VINYL POLYBUTADIENE
Gerald R. Kahle and Lawrence M. Fodor, Bartlesville, Okla., assignors to Phillips Petroleum Company
No Drawing. Filed Oct. 10, 1972, Ser. No. 295,957
Int. Cl. C08c 11/22; C08d 9/08
U.S. Cl. 260—887                    7 Claims

ABSTRACT OF THE DISCLOSURE

Intimate blends of finely particulate polyacrylonitrile with high vinyl polybutadiene can be prepared by slurrying the polyacrylonitrile in a hydrocarbon solution of the polybutadiene and recovering the mixed polymers from the hydrocarbon medium. Recovery can be accomplished by techniques such as steam stripping, evaporation at reduced pressures, distillation, and the like.

BACKGROUND OF THE INVENTION

This invention relates to blends of polymers of acrylonitrile and rubbery polymers of butadiene. In another aspect it relates to a process for preparing such blends.

It has been found that blends of polyacrylonitrile and polybutadiene having a high vinyl content, i.e. high vinyl polybutadiene, can be caused to undergo a thermosetting reaction in the presence of a free radical polymerization initiator. If the blend is compression or injection molded, the resulting thermosetting compound is ordinarily a clear and tough material. Owing to the fact that high levels of polyacrylonitrile can be incorporated into it, the thermoset compound can also possess good stability at elevated temperatures.

Although polyacrylonitrile having a wide molecular weight range can be employed in this process, the lack of good flow properties dictates a preference for low molecular weight polyacrylonitrile when it is desired to employ injection molding techniques.

A polyacrylonitrile of low molecular weight, as indicated by inherent viscosity, particularly suited for use in these blends is obtained by the free radical polymerization of acrylonitrile in a hydrocarbon medium. The polymer resulting this preparation is obtained as a slurry of very finely divided low molecular weight polymer. Attempts to isolate the polymer are complicated in that it clogs filters owing to its fineness. The isolated polymer retains the fine particle size and can be characterized as a low bulk density powder.

When it is attempted to blend this polymer with the elastomeric high vinyl polybutadiene by conventional techniques, as for example on a roll mill or in a Banbury mixer, the finely particulate polymer creates a dust hazard requiring appropriate safety measures be taken such as the wearing of protective clothing and guarding against spark initiated explosions.

In this respect then, these polymers of acrylonitrile are unlike those obtained by conventional techniques such as emulsion polymerization. Polyacrylonitrile obtained in an emulsion polymerization is normally more granular in form but also possesses high molecular weight and is therefore not so well suited for the use in blends which are to be molded using injection molding techniques.

SUMMARY OF THE INVENTION

It is an object of this invention to provide intimate blends of polymers of acrylonitrile and high vinyl polybutadiene.

It is yet another object of this invention to provide a novel process for preparing blends of polymers of acrylonitrile and high vinyl polybutadiene.

In accordance with the objects of this invention, we have found by slurrying finely particulate polyacrylonitrile in a hydrocarbon solution of high vinyl polybutadiene and recovering the polymer mixture from the hydrocarbon medium it is possible to obtain an intimate blend of the two polymers. The blend can be further homogenized by techniques such as roll milling without the attendant dust problem. Furthermore, the slurry of polyacrylonitrile obtained when acrylonitrile is polymerized in a hydrocarbon medium by means of free radical initiation can be employed in the process of this invention and thereby avoid the necessity for isolating the finely divided polymer and the problems associated therewith.

DESCRIPTION OF THE PREFERRED EMBODIMENTS

The process of this invention comprises the steps of slurrying a hydrocarbon insoluble polymer of finely particulate acrylonitrile in a hydrocarbon solution of high vinyl polybutadiene followed by recovery of the blended polymers from the hydrocarbon medium.

Generally speaking, any finely divided polyacrylonitrile can be employed in the process of this invention. The term polyacrylonitrile is intended to include homopolymers of acrylonitrile and copolymers with other vinyl monomers such as styrene, methacrylonitrile, butyl acrylate, methyl acrylate, and the like. However, the polymer must be substantially insoluble in the hydrocarbon medium. Generally speaking, the acrylonitrile will comprise about 80 weight percent or more of the total weight of monomers employed in the polymerization.

The process for polymerizing acrylonitrile that results in a finely particulate polymer such as could be employed in the practice of this invention is described in copending application Ser. No. 295,948, filed Oct. 10, 1972. That process involves dissolving acrylonitrile (with a comonomer if desired) in a hydrocarbon solvent comprising a mixture of an aromatic hydrocarbon such as toluene and a nonaromatic hydrocarbon such as cyclohexane or hexane. At an elevated temperature and in the presence of a free radical initiator such as azobisisobutyronitrile, the acrylonitrile can be caused to polymerize. During the polymerization, it precipitates from the hydrocarbon medium forming a slurry therewith.

The polymer of acrylonitrile obtained in this manner can be isolated from the hydrocarbon medium by conventional techniques. In the dry state the polymer can be characterized as being a finely divided, low bulk density powder. The isolation of the polymer is complicated by its finely divided state, e.g. it clogs filters used in the recovery process.

The high vinyl polybutadiene used in preparing the blends according to the process of this invention is well known to the prior art. Methods of preparing high vinyl polybutadiene are described in U.S. Pats. 3,105,828 and 3,492,282. The vinyl content of the polymer is determined by the extent the butadiene monomer undergoes 1-2 polymerization rather than 1-4 polymerization. Polymers obtained by the processes of the prior art normally have from about 55 percent to greater than 90 percent vinyl content.

The hydrocarbon medium which can be employed in the process of this invention can be selected from paraffinic, cycloparaffinic and aromatic hydrocarbons, including mixtures thereof. Examples of such hydrocarbons include n-pentane, n-hexane, 2,2,4-trimethylpentane, cyclohexane, benzene, toluene, and the like. For ease of isolation, the hydrocarbon or hydrocarbon mixture employed in the process of this invention will normally comprise volatile components, i.e. hydrocarbons having a boiling point less than about 150° C.

As will be apparent to one of skill in the art, the proportion of each component in the blend will be determined by the relative amount of each present in the hydrocarbon diluent prior to recovery. The slurries themselves can be prepared in a variety of methods. For example, the high vinyl polybutadiene can be first dissolved in a hydrocarbon and the polyacrylonitrile slurried in that solution. Alternatively, a slurry of polyacrylonitrile in a hydrocarbon can be used to dissolve the high vinyl polybutadiene. It is presently preferred to prepare separately a slurry of polyacrylonitrile in a hydrocarbon and combine it with a preformed solution of polybutadiene in a hydrocarbon. A source of the polyacrylonitrile slurry can be the slurry obtained in the polymerization of polyacrylonitrile as hereinbefore described. This allows the avoidance of the recovery of the finely divided polymer and the problems attendant therewith. A source of the polybutadiene solution can be the product of the solution polymerization of butadiene obtained by the processes referred to above. Using this solution as it is formed avoids the necessity of recovering the polymer.

The following example will serve to illustrate the process of this invention.

EXAMPLE

A 26 ounce bottle was charged with toluene (200 cc.), cyclohexane (200 cc.), acrylonitrile (50 grams), and azobisisobutyronitrile (0.75 grams). The bottle was capped and filled with nitrogen and allowed to react at 170° F. overnight.

A second 26 ounce bottle was charged with cyclohexane (500 cc.) and tetrahydrofuran (6.4 cc.) and the bottle was capped and filled with nitrogen. Into the bottle was injected butadiene (50 grams) and secondary butyllithium (1.10 cc. of 1.28 molar). The reaction was conducted at 41° F. overnight.

After the allotted reaction time, the contents of the two bottles were combined into a beaker provided with magnetic stirring. Steam was admitted to the mixture through a gas dispersion tube and the solvent stripped while stirring was maintained. The resulting solid mass was dried in a vacuum oven overnight. The dried product was a fluffy dry material which could be conveniently handled.

From the foregoing example, it can be seen that by using the process of this invention a blend of high vinyl polybutadiene with a polyacrylonitrile which is otherwise difficult to isolate and handle can be conveniently prepared. These blends can be employed in thermosetting compositions comprising the blend and a free radical initiator. These blends and the manner by which they can be used to form thermoset compounds is described in copending application Ser. No. 224,310, filed Feb. 7, 1972, now abandoned.

If desired, the blends obtained according to the process of this invention can be further homogenized on a roll mill or other mixing equipment such as a Banbury mixer. Also, additives to the blend can be incorporated into the hydrocarbon medium prior to recovery of the blend therefrom. For example, if it is desired to use the blend in a thermosetting composition the free radical initiator, filler or other additives to the blend can be incorporated into the hydrocarbon medium prior to recovery of the blend.

Thermoset compounds obtained from the blends of this invention can be used wherever resistance to oils and greases or stability at high temperatures are required. For example, molded plastic articles used in or about internal combustion engines could be prepared from these blends.

Recovery of small batches of the mixed polymers from the hydrocarbon medium can be accomplished by steam stripping as described in the example. Larger batches are treated by placing them in a suitable vessel equipped for the introduction of steam and the removal of the liquid and vaporous products. Dispersants and stabilizers can be added to the vessel at this time. The stripper can be operated at various temperatures and pressures. Generally, temperatures within the range from about 150 to about 250° F. and pressures within the range from about 0 to about 25 p.s.i.a. are suitable. The overhead from the stripper comprising water and hydrocarbon is passed to a recovery zone. The polymer/water mixture remaining in the vessel is passed to a polymer recovery zone where the water is separated and the polymer blend is dried.

Another method of separating the solvent from the polymer blend employs evaporation of the solvent from the polymer/hydrocarbon mixture. This is accomplished by placing the mixture, to which stabilizers can be added, in a suitable vessel equipped for heating and removal of vapors under reduced pressures. Temperatures in the range from about 80 to about 250° F. and reduced pressures in the range from about 2 to about 29" mercury are satisfactory for this purpose. The polymer blend remaining behind is removed from the vessel at the conclusion of the operation.

In an alternate embodiment of this technique the polymer/hydrocarbon mixture is admitted to a devolatilizing extruder or the like. The solvent is separated from the polymer blend as the mixture goes through one or more reduced pressure decompression zones in the extruder. The solvent is passed to a recovery zone and the polymer blend issuing from the extruder is pelletized or otherwise converted into a suitable form for further processing.

Another method of separating the solvent from the polymer blend employs distillation of the solvent from the polymer/hydrocarbon mixture. This is accomplished by placing the mixture, to which stabilizers are optionally added, in a suitable vessel equipped for heating and removal of overhead vapors. The vessel is then heated to effect boiling of the solvent and the solvent distilled from the mixture is passed to a recovery zone. The polymer blend remaining behind is removed from the vessel at the conclusion of the operation.

We claim:
1. A process for preparing a blend of
   (1) a finely particulate polymer of acrylonitrile, and
   (2) polybutadiene having a vinyl content of at least about 55 percent by weight comprising the steps of:
      (a) slurrying the polymer of acrylonitrile in a hydrocarbon solution of the polybutadiene wherein said hydrocarbon is chosen from among hydrocarbons in which said polymer of acrylonitrile is insoluble, and
      (b) recovering the polymer mixture from the hydrocarbon.

2. A process according to claim 1 wherein the blend is recovered from the hydrocarbon by steam stripping of said hydrocarbon.

3. A process according to claim 1 wherein the polymer of acrylonitrile is selected from the group consisting of the homopolymer of acrylonitrile and copolymers of acrylonitrile with another vinyl monomer.

4. A process according to claim 1 wherein the slurry of polyacrylonitrile in a hydrocarbon solution comprising polybutadiene is prepared by combining a slurry of polyacrylonitrile in a hydrocarbon with a solution of polybutadiene in a hydrocarbon solvent.

5. A process according to claim 4 wherein the slurry of polyacrylonitrile is obtained as the product of the free radical polymerization of acrylonitrile in a hydrocarbon solvent.

6. A process according to claim 1 wherein the hydrocarbon is selected from the group consisting of paraffinic hydrocarbons, cycloparaffinic hydrocarbons and aromatic hydrocarbons and mixtures thereof.

7. The product of the process of claim 1.

References Cited

UNITED STATES PATENTS

| | | | |
|---|---|---|---|
| 2,593,681 | 4/1952 | Leydon | 260—33.6 A |
| 2,471,743 | 5/1949 | Harrison | 260—29.6 |
| 3,037,948 | 5/1962 | Landler et al. | 260—4 |
| 3,058,930 | 10/1962 | Samour | 260—887 |
| 3,238,172 | 3/1966 | Talalay et al. | 260—887 |

MURRAY TILLMAN, Primary Examiner

J. ZIEGLER, Assistant Examiner

U.S. Cl. X.R.

260—33.6 A, 33.6 UA, 893